(12) United States Patent
Aga et al.

(10) Patent No.: US 11,359,689 B2
(45) Date of Patent: Jun. 14, 2022

(54) IRON OXIDE POWDER FOR BRAKE FRICTION MATERIAL

(71) Applicant: POWDERTECH CO., LTD., Chiba (JP)

(72) Inventors: Koji Aga, Chiba (JP); Takashi Kojima, Chiba (JP)

(73) Assignee: POWDERTECH CO., LTD., Chiba (JP)

( * ) Notice: Subject to any disclaimer, the term of this patent is extended or adjusted under 35 U.S.C. 154(b) by 501 days.

(21) Appl. No.: 16/466,427

(22) PCT Filed: Dec. 12, 2017

(86) PCT No.: PCT/JP2017/044611
§ 371 (c)(1),
(2) Date: Jun. 4, 2019

(87) PCT Pub. No.: WO2018/110563
PCT Pub. Date: Jun. 21, 2018

(65) Prior Publication Data
US 2020/0003268 A1    Jan. 2, 2020

(30) Foreign Application Priority Data

Dec. 12, 2016 (JP) .............................. JP2016-240077
Mar. 27, 2017 (JP) .............................. JP2017-061855
Aug. 3, 2017 (JP) .............................. JP2017-150981

(51) Int. Cl.
*F16D 69/02*   (2006.01)
*C01G 49/06*   (2006.01)

(52) U.S. Cl.
CPC ........... *F16D 69/027* (2013.01); *C01G 49/06* (2013.01); *C01P 2002/87* (2013.01);
(Continued)

(58) Field of Classification Search
None
See application file for complete search history.

(56) References Cited

U.S. PATENT DOCUMENTS

| 4,350,523 A | 9/1982 | Taguchi et al. |
| 2008/0206566 A1 | 8/2008 | Uemoto et al. |

(Continued)

FOREIGN PATENT DOCUMENTS

| CN | 101249563 A | 8/2008 |
| CN | 101932978 A | 12/2010 |

(Continued)

OTHER PUBLICATIONS

International Search Report issued in International Patent Application No. PCT/JP2017/044611, dated Jan. 16, 2018.
(Continued)

*Primary Examiner* — Ronak C Patel
(74) *Attorney, Agent, or Firm* — Greenblum & Bernstein, P.L.C.

(57) ABSTRACT

Provided is an iron oxide powder for a brake friction material which can be suitably used in a brake friction material that is less likely to cause problems regarding brake squealing and that provides superior braking performance. The iron oxide powder for a brake friction material according to a first embodiment of the present invention is characterized by having a sulfur content of 150 ppm or less as measured by combustion ion chromatography, and a saturation magnetization of 20 emu/g or less. The iron oxide powder for a brake friction material according to a second embodiment of the present invention is characterized by having an average particle size of 1.0 µm or more, a chlorine content of 150 ppm or less as measured by combustion ion chromatography, and a saturation magnetization of 20 emu/g or less.

5 Claims, 2 Drawing Sheets

(52) U.S. Cl.
CPC ...... *C01P 2004/03* (2013.01); *C01P 2004/20* (2013.01); *C01P 2004/60* (2013.01); *C01P 2006/12* (2013.01); *C01P 2006/14* (2013.01); *C01P 2006/16* (2013.01); *C01P 2006/42* (2013.01); *C01P 2006/62* (2013.01)

(56) References Cited

U.S. PATENT DOCUMENTS

| | | |
|---|---|---|
| 2009/0257788 A1 | 10/2009 | Matsuda et al. |
| 2014/0051020 A1 | 2/2014 | Harada et al. |
| 2016/0368824 A1 | 12/2016 | Miyao et al. |

FOREIGN PATENT DOCUMENTS

| | | |
|---|---|---|
| JP | 2007-197533 A | 8/2007 |
| JP | 2008-291108 A | 12/2008 |
| JP | 2015-010015 A | 1/2015 |
| JP | 5760599 B2 | 8/2015 |
| WO | 2017/170532 A1 | 10/2017 |

OTHER PUBLICATIONS

Written Opinion (PCT/ISA/237) issued in International Patent Application No. PCT/JP2017/044611, dated Jan. 16, 2018.
U.S. Appl. No. 16/466,799 to Koji Aga et al., filed Jun. 5, 2019.
CN Office Action issued in CN Patent App. No. 201780075510.7, dated Sep. 22, 2020, English translation.
EESR issued in EP Patent App. No. 17880546.1, Oct. 22, 2020.
Xiuzhong Jin , et al., "Magnetic recording physics and materials" Huazhong University of Science and Technology Press, p. 231, Nov. 1990, English translation.

[FIG. 1]
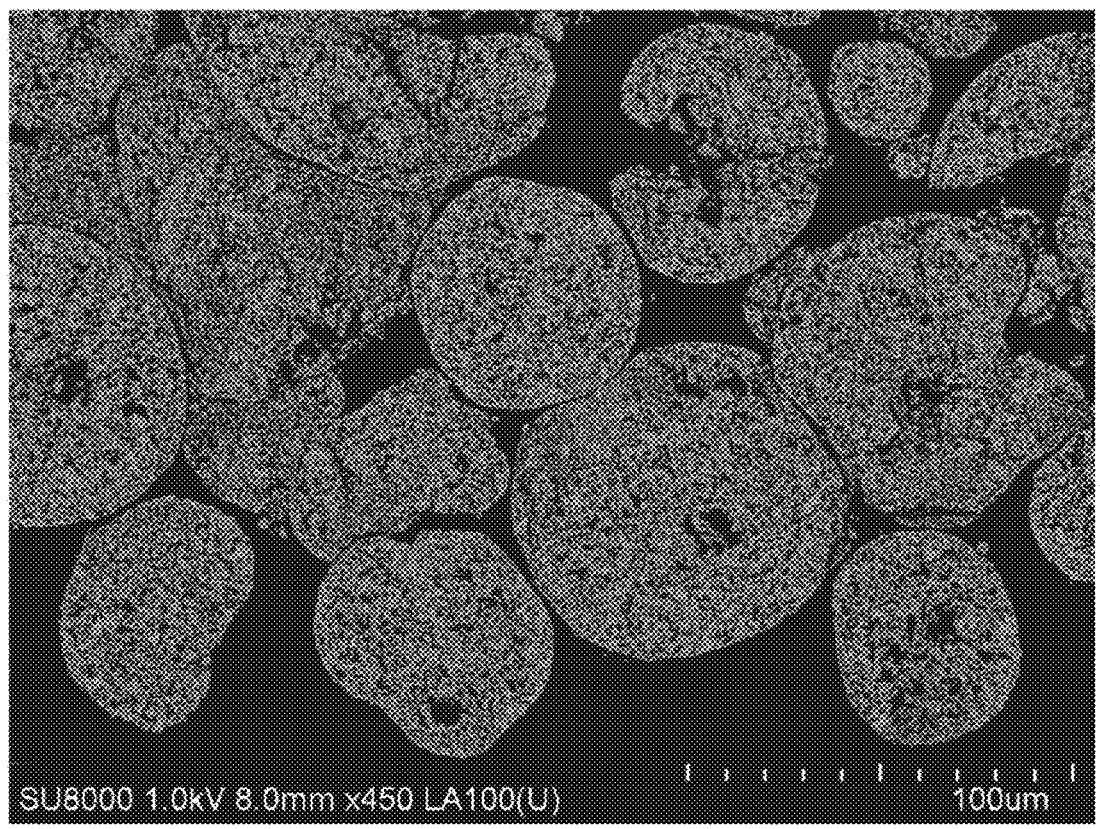

[FIG. 2]
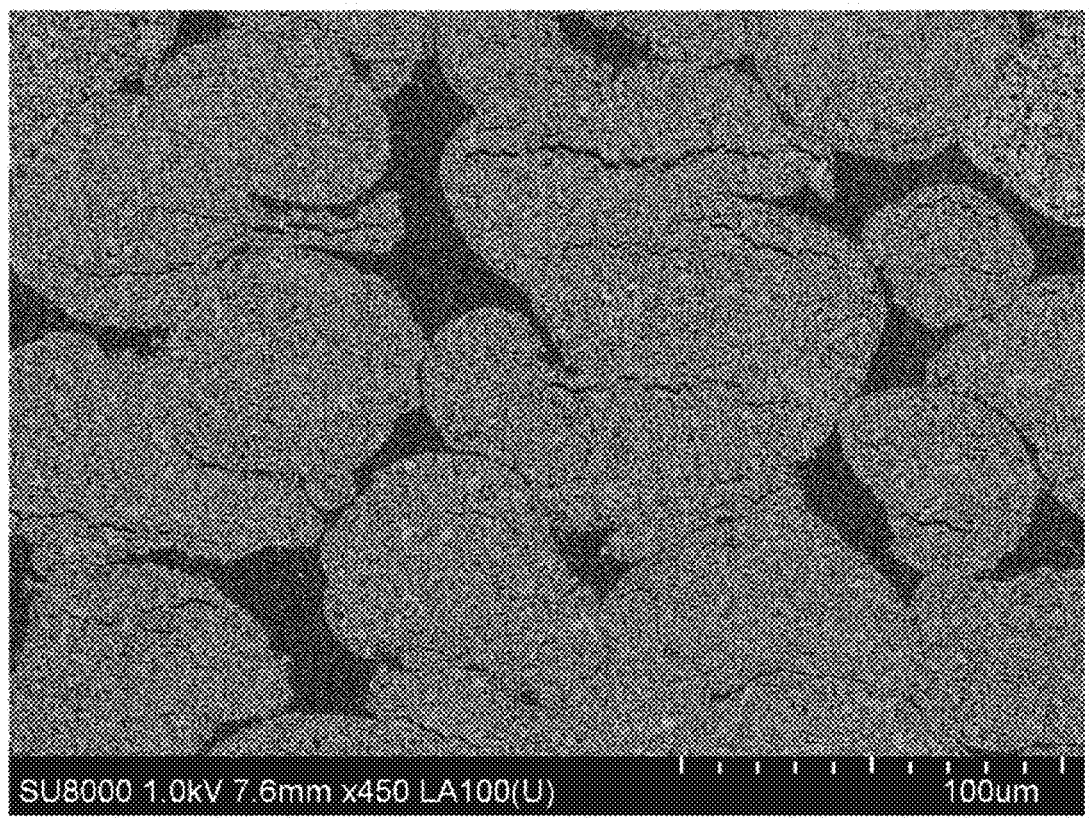

IRON OXIDE POWDER FOR BRAKE FRICTION MATERIAL

TECHNICAL FIELD

The present invention relates to iron oxide powder for a brake friction material.

BACKGROUND ART

As a brake friction material which is to be brought into contact with a rotating (pivoting) disc in a pressing manner and has a function of controlling rotation of the disc with a frictional force (reducing a rotational speed), substances containing magnetite have been widely used (see, e.g., Patent Literature 1).

Magnetite (iron oxide) is advantageous as compared to other materials in view of, for example, inexpensiveness, stable availability, and a large frictional force on a disc.

However, conventionally, when magnetite is used, there is known a problem that so-called brake noise easily occurs. Also, in the conventional art, sufficient braking force cannot be obtained only with magnetite.

CITATION LIST

Patent Literature

Patent Literature 1: Japanese Patent No. 5760599

SUMMARY OF INVENTION

Technical Problem

An object of the present invention is to provide iron oxide powder for a brake friction material suitably usable as a brake friction material which is less likely to occur a problem of brake noise and has an excellent braking property.

Solution to Problem

Such an object is achieved by a first embodiment of the present invention described below.

Iron oxide powder for a brake friction material according to the first embodiment of the present invention has:
 a sulfur content of 500 ppm or less in a combustion ion chromatography, and
 a saturation magnetization of 20 emu/g or less.

The iron oxide powder for a brake friction material according to the first embodiment of the present invention, preferably has a chlorine content of 150 ppm or less in a combustion ion chromatography.

The iron oxide powder for a brake friction material according to the first embodiment of the present invention, preferably has a shape factor SF-2 of 100 or more and 150 or less.

The iron oxide powder for a brake friction material according to the first embodiment of the present invention, preferably has an average particle diameter of 1.0 µm or more.

The iron oxide powder for a brake friction material according to the first embodiment of the present invention, preferably has a pore volume of 10 mm$^3$/g or more and 180 mm$^3$/g or less.

The iron oxide powder for a brake friction material according to the first embodiment of the present invention, preferably has a BET specific surface area of 0.05 m$^2$/g or more and 1.20 m$^2$/g or less.

The iron oxide powder for a brake friction material according to the first embodiment of the present invention, preferably has a peak pore diameter of 0.2 µm or more and 1.2 µm or less.

The iron oxide powder for a brake friction material according to the first embodiment of the present invention, preferably has a blackness (L*value) of 23 or more and 31 or less.

Such an object is also achieved by a second embodiment of the present invention described below.

Iron oxide powder for a brake friction material according to the second embodiment of the present invention has:
 an average particle diameter of 1.0 µm or more,
 a chlorine content of 150 ppm or less in a combustion ion chromatography, and
 a saturation magnetization of 20 emu/g or less.

The iron oxide powder for a brake friction material according to the second embodiment of the present invention, preferably has a pore volume of 10 mm$^3$/g or more and 180 mm$^3$/g or less.

The iron oxide powder for a brake friction material according to the second embodiment of the present invention, preferably has a BET specific surface area of 0.05 m$^2$/g or more and 1.20 m$^2$/g or less.

The iron oxide powder for a brake friction material according to the second embodiment of the present invention, preferably has a peak pore diameter of 0.2 µm or more and 1.2 µm or less.

The iron oxide powder for a brake friction material according to the second embodiment of the present invention, preferably has a blackness (L* value) of 23 or more and 33 or less.

The iron oxide powder for a brake friction material according to the second embodiment of the present invention, preferably has a shape factor SF-1 of 100 or more and 150 or less.

Advantageous Effects of Invention

According to the present invention, it is possible to provide iron oxide powder for a brake friction material suitably usable as a brake friction material which is less likely to occur a problem of brake noise and has an excellent braking property.

BRIEF DESCRIPTION OF DRAWINGS

FIG. 1 This is a figure showing a cross-sectional SEM photograph of a molded article that was produced by using iron oxide powder for a brake friction material of Example 1.

FIG. 2 This is a figure showing a cross-sectional SEM photograph of a molded article that was produced by using iron oxide powder for a brake friction material of Comparative Example 2.

DESCRIPTION OF EMBODIMENTS

Preferred embodiments of the present invention will be described below in detail.
(Iron Oxide Powder for Brake Friction Material)
 First, iron oxide powder for a brake friction material according to the present invention will be described.

The iron oxide powder for a brake friction material of the present invention is used for producing a brake friction material and contains a plurality of particles mainly composed of iron oxides.

Meanwhile, a material containing magnetite (iron oxide) produced by a wet synthesis has been widely used as a brake friction material since it has advantages such as inexpensiveness, stable availability and a large frictional force on a disc as compared with other materials.

However, conventionally, when magnetite is used, because it has a high magnetization (saturation magnetization) and gives fine particles, there is known a problem that so-called brake noise easily occurs. In particular, such a problem significantly occurs in the cases where the proportion of the magnetite (iron oxide) in the brake friction material is high. The brake noise is generated due to a fine vibration of a rotor, which is caused when dust of the friction material, which is generated when the brake friction material slides, magnetically condenses to be difficult to be discharged from a gap between the friction material and the rotor. Also, in the conventional art, magnetite alone, which is produced by a wet synthesis, is present in the friction material widely and thinly, and therefore, sufficient braking force cannot be obtained.

Also, in the conventional art, in order to suppress the occurrence of the problems described above, it has also been proposed to include components other than magnetite in the brake friction material at a relatively high content rate. However, in such a case, there is a problem such as a decrease in wear resistance of the brake friction material.

Therefore, the present inventors conducted intensive studies for the purpose of effectively preventing and suppressing the occurrence of the problems described above while making use of the advantages of iron oxide, and as a result, have reached the present invention.

That is, the iron oxide powder for a brake friction material (hereinafter, also simply referred to as "iron oxide powder") according to a first embodiment of the present invention has: a sulfur content in a combustion ion chromatography (hereinafter, also simply referred to as "sulfur content") of 500 ppm or less; and a saturation magnetization (hereinafter, also simply referred to as "magnetization" in some cases) of 20 emu/g (1 emu/g=1 A·m$^2$/kg) or less.

Furthermore, the iron oxide powder for a brake friction material (hereinafter, also simply referred to as "iron oxide powder") according to a second embodiment of the present invention has: an average particle diameter of 1.0 μm or more; a chlorine content in a combustion ion chromatography (hereinafter, also simply referred to as "chlorine content") of 150 ppm or less; and a magnetization (saturation magnetization) of 20 emu/g or less.

As a result, iron oxide powder which can effectively prevent oxidation, corrosion and the like of a disc with which a brake friction material comes into contact, and is suitably usable as a brake friction material which is less likely to occur a problem of brake noise and excellent in the braking property (braking performance) can be provided.

In particular, even in the cases where the proportion of the iron oxide powder in the brake friction material is high, the occurrence of the problems described above can be effectively prevented, and thus, the braking property of the brake friction material can be further improved.

In addition, the average particle diameter as described above can allow a place where the iron oxide particles are locally highly packed and a place where the iron oxide particles are not locally highly packed, as compared to magnetite obtained by a conventional wet synthesis, to exist in the friction material.

Furthermore, even in the cases where the components other than the iron oxide powder in the brake friction material are relatively less, sufficient braking property can be obtained since a state where the iron oxide particles are locally highly packed is maintained. Therefore, the occurrence of problems such as a decrease in wear resistance of the brake friction material can also be effectively prevented. Also, since the iron oxide powder with such a particle diameter described above hardly scatters and handleability of the iron oxide powder is excellent, the safety of workers can be enhanced during handling of the iron oxide powder (e.g., in manufacturing the brake friction material). In addition, fluidity of the iron oxide powder and mixing property with other components can be made excellent, and thus, for example, productivity of the brake friction material can be further improved.

On the other hand, in the cases where the conditions described above are not satisfied, satisfactory results cannot be obtained.

For example, in the case where the average particle diameter of the iron oxide powder is extremely small, it is difficult to make the braking property of the brake friction material sufficiently excellent. Also, the handleability of the iron oxide powder is lowered, and therefore, there arises a problem of securing the safety of workers who handle the iron oxide powder and the productivity of the brake friction material is also lowered.

In addition, in the case where the sulfur content or the chlorine content is extremely large, oxidation, corrosion or the like of the disc with which the brake friction material comes into contact easily occurs, and thus, it is not possible to stably prevent the occurrence of the problem of brake noise and to stably achieve an excellent braking property over a long period of time.

Furthermore, in the case where the saturation magnetization of the iron oxide powder is extremely large, the brake friction material containing the iron oxide powder tends to cause the problem of brake noise. This is considered to be caused because, generally, the disc is mainly composed of iron, and in the case where the saturation magnetization of the iron oxide powder is extremely large, the coercivity and residual magnetization of the iron oxide particles contained in dust generated at the time of brake sliding become large due to the stress at the time of brake sliding, which results in magnetic aggregation.

The average particle diameter of the iron oxide powder in the first embodiment is preferably 1.0 μm or more, more preferably 10 μm or more and 200 μm or less, still more preferably 20 μm or more and 150 μm or less, and most preferably 30 μm or more and 100 μm or less.

As a result, the braking property of the brake friction material can be further improved. In addition, in the case where the average particle diameter of the iron oxide powder is the upper limit value or less, damage to the disc with which the brake friction material containing the iron oxide powder comes into contact can be more effectively prevented. In addition, the durability of the brake friction material containing the iron oxide powder can be further improved. In particular, the average particle diameter of the iron oxide powder is preferably 30 μm or more and 100 μm or less and, within this range, the particle diameter size of the iron oxide powder and the granular (grain) size of the iron oxide powder are well balanced and a state of the favorable braking property of the brake can be maintained for a long period of time.

In addition, a locally-highly-packed place and a not-locally-highly-packed place can uniformly exist in the friction material as compared to the magnetite obtained by a conventional wet synthesis. Furthermore, even in the case where the components other than the iron oxide powder in the brake friction material are relatively less, sufficient braking property can be obtained because a state where the iron oxide particles are locally highly packed is maintained. Therefore, the occurrence of problems such as the decrease in wear resistance of the brake friction material can also be effectively prevented. Also, since the iron oxide powder with such a particle diameter described above hardly scatters and handleability of the iron oxide powder is excellent, the safety of workers can be enhanced during handling of the iron oxide powder (e.g., in manufacturing the brake friction material). In addition, fluidity of the iron oxide powder and mixing property with other components can be made excellent, and thus, for example, productivity of the brake friction material can be further improved.

On the other hand, in the case where the average particle diameter of the iron oxide powder is extremely small, it is difficult to make the braking property of the brake friction material sufficiently excellent. Also, the handleability of the iron oxide powder is lowered, and therefore, there arises a problem of securing the safety of workers who handle the iron oxide powder and the productivity of the brake friction material is also lowered.

Furthermore, as described above, the average particle diameter of the iron oxide powder in the second embodiment may be 1.0 μm or more, and is preferably 5.0 μm or more and 200 μm or less, more preferably 7.0 μm or more and 150 μm or less, and still more preferably 10 μm or more and 100 μm or less.

As a result, the braking property of the brake friction material can be further improved. In addition, in the case where the average particle diameter of the iron oxide powder is the upper limit value or less, damage to the disc with which the brake friction material containing the iron oxide powder comes into contact can be more effectively prevented. In addition, the durability of the brake friction material containing the iron oxide powder can be further improved. In particular, the average particle diameter of the iron oxide powder is preferably 30 μm or more and 100 μm or less and, within this range, the particle diameter size of the iron oxide powder and the granular (grain) size of the iron oxide powder are well balanced and a state of the favorable braking property of the brake can be maintained for a long period of time.

As described above, the sulfur content in the iron oxide powder in the first embodiment may be 500 ppm or less on a weight basis, and is preferably 200 ppm or less, more preferably 100 ppm or less, and still more preferably 60 ppm or less.

As a result, oxidation, corrosion or the like of the disc with which the brake friction material comes into contact can be more effectively prevented, and thus, it is possible to stably prevent the occurrence of the problem of brake noise and to stably achieve an excellent braking property over a longer period of time.

In the first embodiment, the chlorine content in a combustion ion chromatography (hereinafter, also simply referred to as "chlorine content") in the iron oxide powder is preferably 150 ppm or less, more preferably 100 ppm or less, still more preferably 20 ppm or less, and most preferably 10 ppm or less.

As a result, oxidation, corrosion or the like of the disc with which the brake friction material comes into contact can be more effectively prevented, and thus, it is possible to stably prevent the occurrence of the problem of brake noise and to stably achieve an excellent braking property over a longer period of time.

On the other hand, in the case where the chlorine content is extremely large, oxidation, corrosion or the like of the disc with which the brake friction material comes into contact easily occurs, and thus, it is not possible to stably prevent the occurrence of the problem of brake noise and to stably achieve an excellent braking property over a long period of time.

Furthermore, as described above, the chlorine content in the iron oxide powder in the second embodiment may be 150 ppm or less on a weight basis, and is preferably 100 ppm or less, more preferably 20 ppm or less, and still more preferably 10 ppm or less.

As a result, oxidation, corrosion or the like of the disc with which the brake friction material comes into contact can be more effectively prevented, and thus, it is possible to stably prevent the occurrence of the problem of brake noise and to stably achieve an excellent braking property over a longer period of time.

Furthermore, as described above, the saturation magnetization of the iron oxide powder may be 20 emu/g or less, and is preferably 10 emu/g or less, more preferably 5 emu/g or less, and still more preferably 1 emu/g or less.

As a result, the problem of brake noise can be more effectively prevented. In particular, even in the case where the brake friction material contains the iron oxide powder at a higher content, the problem of brake noise can be effectively prevented.

In the present description, the average particle diameter refers to volume average particle diameter unless otherwise noted.

The volume average particle diameter can be obtained, for example, by the following measurement. That is, first, 10 g of iron oxide powder as a sample and 80 ml of water are placed in a 100 ml-beaker, and thereto are added 2 to 3 drops of a dispersant (sodium hexametaphosphate), followed by dispersion using an ultrasonic homogenizer (e.g., UH-150, manufactured by SMT. Co. LTD.). In the case where the UH-150 manufactured by SMT. Co. LTD. is used as the ultrasonic homogenizer, for example, the output level may be set to be 4 and dispersion may be performed for 20 seconds. Then, bubbles formed on a beaker surface are removed, and then the sample is introduced into a microtrack particle size analyzer (e.g., Model 9320-X100, manufactured by Nikkiso Co., Ltd.) and measurement can be performed.

In addition, the chlorine content in the iron oxide powder can be obtained by quantitative analysis of the anion components contained in the iron oxide powder by using a combustion ion chromatography.

The combustion ion chromatography can be performed, for example, under the following conditions.

Combustion device: AQF-2100H, manufactured by Mitsubishi Chemical Analytech Co., Ltd.
Sample amount: 50 mg
Combustion temperature: 1,100° C.
Combustion time: 10 minutes
Ar flow rate: 400 ml/imin
$O_2$ flow rate: 200 ml/min Humidification air flow rate: 100 ml/min Absorbent solution: solution in which 1 wt % of hydrogen peroxide is dissolved in the following eluent Analyzer: IC-2010, manufactured by Tosoh Corporation Column: TSKgel SuperIC-Anion HS (4.6 mm I.D.×1 cm+4.6 mm I.D.×10 cm)

Eluent: solution in which 3.8 mmol of $NaHCO_3$ and 3.0 mmol of $Na_2CO_3$ are dissolved in 1 L of water Flow rate: 1.5 mL/min Column temperature: 40° C.

Injection volume: 30 μL

Measurement mode: Suppressor method

Detector: CM detector

Standard sample: anion-mixed standard solution, manufactured by Kanto Chemical Co., INC.

In the present description, the saturation magnetization refers to magnetization (saturation magnetization) obtained by a VSM measurement (measurement by a vibrating sample magnetometer) under the application of a magnetic field of 5K·1000/4πA/m, unless otherwise noted.

More specifically, for example, it can be obtained as follows. That is, first, iron oxide powder is filled in a cell with an inner diameter of 5 mm and a height of 2 mm, and set in a vibrating sample magnetometer. Next, a magnetic field is applied and swept up to 5 K·1000/4π·A/m, and then the applied magnetic field is decreased to create a hysteresis curve. The magnetization (saturation magnetization) can be obtained from the data of the curve. As a vibrating sample magnetometer, for example, VSM-C7-10A (manufactured by Toei Industry Co., Ltd.) or the like can be used.

The iron oxide powder may be composed mainly of iron oxides, and is preferably composed mainly of $\alpha\text{-}Fe_2O_3$.

As a result, the saturation magnetization of the iron oxide powder can be lowered more reliably. In addition, since the iron oxide powder with low saturation magnetization is less likely to react with oxygen and cause less structural change with temperature, stability is particularly excellent. As a result, a brake friction material containing the iron oxide powder can stably exhibit excellent characteristics over a longer period of time.

The content of $\alpha\text{-}Fe_2O_3$ in the iron oxide powder is preferably 90 mass % or more, more preferably 95 mass % or more, and still more preferably 98 mass % or more.

As a result, the effects as described above can be more significantly exhibited.

The iron oxide powder is mainly composed of Fe and O, and may contain elements other than Fe and O. Examples thereof include Mn, Sr, Mg, Ti, Si, Cl, Ca, Al, and the like.

In the case where the iron oxide powder contains elements other than Fe and O, the content of the elements other than Fe and O (in the case where two or more kinds of elements are included, the sum of the contents thereof) in the iron oxide powder is preferably 2.0 mass % or less, more preferably 1.0 mass % or less and still more preferably 0.5 mass % or less.

The proportion of particles having a particle diameter of 0.8 μm or less among particles constituting the iron oxide powder is preferably 50 mass % or less, more preferably 30 mass % or less, and still more preferably 10 mass % or less.

As a result, the braking property of the brake friction material can be further improved. In addition, since the adhesion property between resin and the iron oxide powder which constitute the brake material is improved due to the reduced amount of fine particles, durability of the brake friction material containing the iron oxide powder can be further improved.

The particles constituting the iron oxide powder preferably has a shape factor SF-1 of 100 or more and 150 or less, more preferably 100 or more and 140 or less, and still more preferably 100 or more and 130 or less.

As a result, mixing property with other components used for manufacturing the brake friction material is improved. In addition, since the sphericity is high within the range described above, the volume of the iron oxide particles contained per unit volume can be easily increased. As a result, an easy-to-use material as a material with low efficiency (a relatively small degree of influence on characteristics by a large amount of usage) on various characteristics required in the brake friction material, can be obtained.

In this regard, the shape factor SF-1 never falls below the above-described lower limit value.

In addition, in the case where the shape factor SF-1 exceeds the above-described upper limit value, gap between particles may possibly become large, which may possibly cause a problem that the iron oxide powder cannot be used at a highly packed amount.

The shape factor SF-1 can be calculated by the following equation (1).

$$SF\text{-}1 = (R^2/S) \times (\pi/4) \times 100 \qquad (1)$$

(In the equation (1), R indicates a Feret diameter (maximum) and S indicates a projection area)

The shape factor SF-1 can be calculated, for example, by obtaining the Feret diameter R (maximum) and S (projection area) of the particles constituting the iron oxide powder with the following measurement.

That is, for example, 100 particles constituting the iron oxide powder are observed by using FE-SEM (SU-8020), manufactured by Hitachi High-Technologies Corporation, and the Feret diameter R (maximum) and S (projection area) are obtained by using an image analysis software, Image-Pro Plus, and then the value calculated from the above equation (1) is taken as the shape factor SF-1'. Then, the average value of the shape factor SF-1' for each particle is employed as the shape factor SF-1 of the particles constituting the iron oxide powder.

The SEM image used in the image analysis is preferably captured in a dispersed state in which the particles do not overlap each other, and is preferably captured at a magnification at which about 5 to 20 captured particles can be taken per field of view. (In the case of particles with a particle diameter of 10 μm or more, image-capturing is preferably performed at a magnification of about 100 to 450 times, and in the case of particles of 10 μm or less, image-capturing is preferably performed at a magnification of about 1,000 to 100,000 times.)

The particles constituting the iron oxide powder preferably has a shape factor SF-2 of 100 or more and 150 or less, more preferably 100 or more and 125 or less, and still more preferably 100 or more and 120 or less.

As a result, mixing property with other components used for manufacturing the brake friction material is improved. In addition, since the sphericity is high within the range described above, the volume of the iron oxide particles contained per unit volume can be easily increased. As a result, an easy-to-use material as a material with low efficiency (a relatively small degree of influence on characteristics by a large amount of usage) on various characteristics required in the brake friction material, can be obtained.

In this regard, the shape factor SF-2 never falls below the above-described lower limit value (it does not become smaller than 100 because SF-2=100 means a true sphere).

In addition, in the case where the shape factor SF-2 exceeds the above-described upper limit value, gap between particles may possibly become large, which may possibly cause a problem that the iron oxide powder cannot be used at a highly packed amount.

The shape factor SF-2 is a value obtained by dividing the value squaring the projection perimeter of a particle by the projection area of the particle, then dividing by 4n and multiplying by 100. It has a value closer to 100 as the shape of the particle is closer to a sphere.

More specifically, the shape factor SF-2 can be calculated, for example, by obtaining S (projection area) and L (projected perimeter) of particles constituting the iron oxide powder by the following measurement.

That is, for example, 100 particles constituting the iron oxide powder are observed by using FE-SEM (SU-8020), manufactured by Hitachi High-Technologies Corporation, and the S (projection area) and L (projection perimeter) are obtained by using the image analysis software, Image-Pro Plus, and then the value calculated from the following equation (2) is taken as the shape factor SF-2'. Then, the average value of the shape factor SF-2' for each particle is employed as the shape factor SF-2 of the particles constituting the iron oxide powder.

$$SF\text{-}2=((L^2/S)/4\pi)\times 100 \qquad (2)$$

(L indicates the projection perimeter, and S indicates the projection area)

The SEM image used in the image analysis is preferably captured in a dispersed state in which the particles do not overlap each other, and is preferably captured at a magnification at which about 5 to 20 captured particles can be taken per field of view. (In the case of particles with a particle diameter of 10 μm or more, image-capturing is preferably performed at a magnification of about 100 to 450 times, and in the case of particles of 10 μm or less, image-capturing is preferably performed at a magnification of about 1,000 to 100,000 times.)

The iron oxide powder preferably has a pore volume of 10 mm$^3$/g or more and 180 mm$^3$/g or less, more preferably 20 mm$^3$/g or more and 150 mm$^3$/g or less, and still more preferably 30 mm$^3$/g or more and 100 mm$^3$/g or less.

As a result, while making the braking property of the brake friction material containing the iron oxide powder more excellent, damage to the disc with which the brake friction material containing the iron oxide powder comes into contact can be more effectively prevented, and durability of the brake friction material can be further improved. In addition, it is possible to more effectively prevent relatively large particles of the iron oxide powder from undesirably dropping off from the brake friction material.

On the other hand, in the case where the pore volume of the iron oxide powder is less than the above-described lower limit value, one particle of the iron oxide powder becomes extremely hard, and damage on the disc and dropping-off of particles are prone to occur. Therefore, the disc with which the brake friction material comes into contact is easily damaged. In addition, the undesirable dropping-off of relatively large particles of the iron oxide powder from the brake friction material easily occurs.

In the case where the pore volume of the iron oxide powder exceeds the above-described upper limit value, the particles are easily broken due to the stress of braking, and the braking property and durability deteriorate. Therefore, the braking property of the brake friction material containing the iron oxide powder tends to be lowered. In addition, durability of the brake friction material tends to be lowered.

The pore diameter and pore volume of the iron oxide powder can be obtained, for example, by a measurement using mercury porosimeters, Pascal 140 and Pascal 240 (manufactured by Thermo Fisher Scientific Ltd.).

The iron oxide powder preferably has a peak pore diameter of 0.2 μm or more and 1.2 μm or less, and more preferably 0.3 μm or more and 1.0 μm or less.

The peak pore diameter means a pore diameter with the highest frequency of presence in the distribution of the pore diameters of the iron oxide powder.

As a result, in the brake friction material, a binder (binding material) can be more effectively made penetrate into the pores of the iron oxide powder, and thus the adhesion property between the iron oxide powder and the binder can be further improved. As a result, durability of the brake friction material can be further improved. Also, the damage to the disc with which the brake friction material containing the iron oxide powder comes into contact can be more effectively prevented, and the relatively large particles of the iron oxide powder can be more effectively prevented from undesirably dropping off from the brake friction material. In addition, the braking property of the brake friction material can be further improved.

On the other hand, in the case where the peak pore diameter of the iron oxide powder is less than the above-described lower limit, resin constituting the brake material is difficult to penetrate into the iron oxide powder. Therefore, the iron oxide powder easily drops off and damage of the disc easily occurs, and thus durability of the brake friction material tends to be lowered. In addition, the disc with which the brake friction material comes into contact is easily damaged. Also, the undesirable dropping-off of relatively large particles of the iron oxide powder from the brake friction material easily occurs.

In addition, in the case where the peak pore diameter of the iron oxide powder exceeds the above-described upper limit, since the iron oxide powder is likely to be broken from a portion where the peak pore diameter is large due to the stress of braking, the braking property and durability deteriorate. Therefore, the braking property of the brake friction material containing the iron oxide powder tends to be lowered. In addition, the durability of the brake friction material tends to be lowered.

The iron oxide powder preferably has a BET specific surface area of 0.05 m$^2$/g or more and 1.20 m$^2$/g or less, more preferably 0.10 m$^2$/g or more and 1.0 m$^2$/g or less, and still more preferably 0.15 m$^2$/g or more and 0.80 m$^2$/g or less.

As a result, in the brake friction material, the adhesion property between the iron oxide powder and a binder can be further improved. As a result, durability of the brake friction material can be further improved. Also, the damage to the disc with which the brake friction material containing the iron oxide powder comes into contact can be more effectively prevented, and the relatively large particles of the iron oxide powder can be more effectively prevented from undesirably dropping off from the brake friction material. In addition, the braking property of the brake friction material can be further improved.

On the other hand, in the case where the BET specific surface area of the iron oxide powder is less than the above-described lower limit, since the iron oxide powder is difficult to adhere to resin constituting the brake material, the iron oxide powder easily drops off. In addition, since damage to the disc easily occurs, the disc with which the brake friction material comes into contact is easily damaged. Also, the undesirable dropping-off of relatively large particles of the iron oxide powder from the brake friction material easily occurs.

In addition, in the case where the BET specific surface area of the iron oxide powder exceeds the above-described upper limit, since the resin constituting the brake material easily penetrates into the iron oxide powder, elasticity of the brake material resin is lost and the braking property and durability deteriorate. As a result, the braking property of the brake friction material containing the iron oxide powder tends to be lowered. In addition, durability of the brake friction material tends to be lowered.

The BET specific surface area can be determined by a measurement using a specific surface area-measuring device (e.g., model: Macsorb HM model-1208 (manufactured by Mountech Co.)).

The particles constituting the iron oxide powder of the present invention are preferably aggregates with an appropriate particle diameter, formed by aggregation of fine particles of iron oxides by sintering.

Originally, iron oxide represented by $\alpha$-$Fe_2O_3$ has a strongly reddish color. However, in the case where the constituent particles are aggregates of fine particles of iron oxide, the iron oxide powder exhibits a black color even though it is composed of $\alpha$-$Fe_2O_3$.

When the constituent particles of the iron oxide powder exhibit a black color, the appearance of the brake friction material can be made more excellent.

The iron oxide powder in the first embodiment preferably has a blackness (L* value) of 23 or more and 31 or less, more preferably 25 or more and 31 or less, and still more preferably 27 or more and 31 or less.

As a result, the appearance of the brake friction material containing the iron oxide powder can be further improved.

In the case where the blackness (L* value) of the iron oxide powder in the first embodiment is smaller than 23, it means that the particle diameter of the iron oxide powder is extremely small, which is not preferable. In the case of larger than 31, it means that the particle diameter of the iron oxide powder is extremely large, which is not preferable.

In the first embodiment, since the iron oxide fine particles (granules formed in a granulation step) before becoming aggregates have a particle diameter of about 0.1 µm and thus are strongly reddish and yellowish, a* does not become smaller than −0.2 even after becoming aggregates by sintering. In the case where a* is larger than 6, it means that the iron oxide fine powder is not sufficiently aggregated by sintering, which is not preferable.

In the first embodiment, since the iron oxide fine particles (granules formed in a granulation step) before becoming aggregates have a particle diameter of about 0.1 µm and thus are strongly reddish and yellowish, b* does not become smaller than −3.0 even after becoming aggregates by sintering. In the case where b* is larger than 1.0, it means that the iron oxide fine powder is not sufficiently aggregated by sintering, which is not preferable.

The iron oxide powder in the second embodiment preferably has a blackness (L* value) of 23 or more and 33 or less, more preferably 25 or more and 31 or less, and still more preferably 27 or more and 31 or less.

As a result, the appearance of the brake friction material containing the iron oxide powder can be further improved.

In the case where the blackness (L* value) of the iron oxide powder in the second embodiment is smaller than 23, it means that the particle diameter of the iron oxide powder is extremely small, which is not preferable. In the case of larger than 33, it means that the particle diameter of the iron oxide powder is extremely large, which is not preferable.

In the second embodiment, since the iron oxide fine particles (granules formed in a granulation step) before becoming aggregates has a particle diameter of about 0.1 µm and thus are strongly reddish and yellowish, a* does not become smaller than −0.3 even after becoming aggregates by sintering. In the case where a* is larger than 6.2, it means that the iron oxide fine powder is not sufficiently aggregated by sintering, which is not preferable.

In the second embodiment, since the iron oxide fine particles (granules formed in a granulation step) before becoming aggregates has a particle diameter of about 0.1 µm and thus are strongly reddish and yellowish, b* does not become smaller than −3.0 even after becoming aggregates by sintering. In the case where b* is larger than 1.0, it means that the iron oxide fine powder is not sufficiently aggregated by sintering, which is not preferable.

The blackness (L* value), the a* value and the b* value can be obtained by a measurement using a color-difference meter (e.g., x-rite 938, manufactured by X-Rite Co., Ltd.).

The particles constituting the iron oxide powder may be those having been subjected to surface treatment.

Examples of surface treatment agents used for the surface treatment of the particles include silane coupling agents, phosphoric acid compounds, carboxylic acids, fluorine compounds, and the like.

In particular, in the case where the particles constituting the iron oxide powder are subjected to a surface treatment with a silane coupling agent, aggregation of the particles can be more effectively prevented, and thus fluidity and handleability of the iron oxide powder and of a composition containing the iron oxide powder can be further improved. In addition, dispersibility of the iron oxide powder in a liquid composition containing the iron oxide powder can be further improved.

Examples of the silane coupling agent to be used include silane compounds having a silyl group and a hydrocarbon group. In particular, the silane coupling agent preferably has an alkyl group having a carbon number of 8 or more and 10 or less.

As a results, aggregation of the particles can be further effectively prevented and fluidity and handleability of the iron oxide powder and a composition containing the iron oxide powder can be further improved. Moreover, dispersibility of the iron oxide powder in a liquid composition containing the iron oxide powder can be further improved.

Examples of the phosphoric acid compound include lauryl phosphoric acid ester, lauryl 2-phosphoric acid ester, and phosphoric acid esters of steareth-2 phosphoric acid and 2-(perfluorohexyl) ethyl phosphonic acid, and the like.

Examples of the carboxylic acid to be used include compounds (fatty acids) having a hydrocarbon group and a carboxyl group. Specific examples of such compounds include decanoic acid, tetradecanoic acid, octadecanoic acid, cis-9-octadecenic acid, and the like.

Examples of the fluorine compounds include compounds having a structure in which at least a part of hydrogen atoms of a silane coupling agent, a phosphoric acid-based compound or a carboxylic acid, as described above, is substituted with a fluorine atom (fluorinated silane compounds, fluorinated phosphoric acid compounds, fluorine-substituted fatty acids), and the like.

In addition, the sulfur content in a combustion ion chromatography (hereinafter, also simply referred to as "sulfur content") measured for the iron oxide powder is preferably 500 ppm or less on a weight basis, more preferably 200 ppm or less, and still more preferably 60 ppm or less.

As a result, oxidation, corrosion or the like of the disc with which the brake friction material comes into contact can be more effectively prevented, and thus, it is possible to stably prevent the occurrence of the problem of brake noise and to stably achieve an excellent braking property over a longer period of time.

The sulfur content in the iron oxide powder can be obtained by quantitatively analyzing anion components contained in the iron oxide powder in a combustion ion chromatography, in the same manner as in the quantitative analysis of the chlorine content described above.

In addition, the iron oxide powder preferably has pH of 6.0 or more and 9.0 or less, more preferably 6.2 or more and 8.7 or less, and still further preferably 6.3 or more and 8.0 or less.

As a result, oxidation, corrosion or the like of the disc with which the brake friction material comes into contact can be more effectively prevented, and thus, it is possible to stably prevent the occurrence of the problem of brake noise and to stably achieve an excellent braking property over a longer period of time.

In the present description, pH of the iron oxide powder refers to pH obtained by preparing a solution in the procedure in accordance with JIS K0102 and measuring with a glass electrode method.

The iron oxide powder in the first embodiment preferably has an apparent density of 1.50 g/cm$^3$ or more and 2.50 g/cm$^3$ or less, and more preferably 1.60 g/cm$^3$ or more and 2.40 g/cm$^3$ or less.

The iron oxide powder in the second embodiment preferably has an apparent density of 1.10 g/cm$^3$ or more and 2.50 g/cm$^3$ or less, and more preferably 1.20 g/cm$^3$ or more and 2.30 g/cm$^3$ or less.

As a result, the damage to the disc with which the brake friction material containing the iron oxide powder comes into contact can be more effectively prevented and durability of the brake friction material can be further improved. In particular, in the case where the apparent density of the iron oxide powder is within the range described above, the iron oxide powder can contain pores (fine pores) at an appropriate ratio. As a result, a binder can be more preferably made penetrate into the pores (fine pores) and thus, while making the braking property of the brake friction material containing the iron oxide powder more excellent, durability of the brake friction material can be further improved. In addition, it is possible to more effectively prevent relatively large particles of the iron oxide powder from undesirably dropping off from the brake friction material.

On the other hand, in the case where the apparent density of the iron oxide powder is less than the above-described lower limit value, the braking property of the brake friction material containing the iron oxide powder tends to be lowered. In addition, durability of the brake friction material tends to be lowered.

In addition, in the case where the apparent density of the iron oxide powder exceeds the above-described upper limit value, durability of the brake friction material tends to be lowered. In addition, the disc with which the brake friction material comes into contact is easily damaged. Also, the undesirable dropping-off of relatively large particles of the iron oxide powder from the brake friction material easily occurs.

(Method of Manufacturing Iron Oxide Powder)

The iron oxide powder of the present invention may be manufactured by any method, and can be suitably manufactured, for example, by the method described below.

For example, the iron oxide powder of the present invention can be manufactured by a method including a granulation step of spraying and drying a slurry containing Fe$_2$O$_3$ powder to granulate and a sintering step of sintering the obtained granules.

In the case where such a method is used, among iron oxide powder satisfying the conditions described above, those having a relatively small particle diameter (e.g., those having an average particle diameter of 1.0 µm or more and 100 µm or less) can be suitably manufactured. In particular, in a wet granulation method (e.g., the method described in Japanese Patent No. 5760599, etc.) using an acid or alkali in the manufacturing process, only particles having an average particle diameter of 10 µm or less can be manufactured. On the other hand, according to the method described above, iron oxide powder with a relatively large particle diameter can be suitably manufactured. Unlike the wet granulation method using an acid or alkali in the manufacturing process, the finally obtained iron oxide powder can be effectively prevented from containing remaining impurities or the like derived from the acid or alkali, and durability and reliability of the iron oxide powder and the brake friction material containing the iron oxide powder can be further improved. Furthermore, in the wet granulation method using an acid or alkali in the manufacturing process, it is difficult to make the saturation magnetization of the iron oxide powder sufficiently small. On the other hand, in the method described above, since the magnetization can be controlled in the sintering process by temperature or gas atmosphere, the iron oxide powder having a sufficiently small saturation magnetization can be easily obtained. In addition, in the case where the average particle diameter of the iron oxide powder is a value within the range described above, damage to the disk with which the brake friction material containing the iron oxide powder comes into contact can be more effectively prevented. In addition, durability of the brake friction material containing the iron oxide powder can be further improved.

For the preparation of the slurry, in addition to the Fe$_2$O$_3$ powder, for example, water, a binder such as polyvinyl alcohol (PVA) or polyvinyl pyrrolidone (PVP), a dispersant, carbon black, charcoal, and the like can be used.

However, the content of the organic substance in the slurry is preferably 0.30 mass % or less, and more preferably 0.20 mass % or less, based on the total amount of the slurry.

As a result, the saturation magnetization of the iron oxide powder can be more suitably controlled.

The slurry preferably has a viscosity of 0.3 poise or more and 5 poise or less, and more preferably 0.5 poise or more and 4 poise or less.

As a result, handleability of the slurry can be further improved, and spraying and drying of the slurry can be more suitably performed. As a result, granules of the desired size and shape can be manufactured with better productivity.

In the present description, the viscosity refers to a value measured at 25° C. by using a B-type viscometer (e.g., Viscotester VT-04, manufactured by Rion Co., Ltd.).

Spraying of the slurry can be suitably performed by, for example, spray-drying.

The average particle diameter of the granulated product formed in the granulation step is preferably 20 µm or more and 120 µm or less.

As a result, constituent particles of the finally obtained iron oxide powder can be more reliably controlled to have a size as described above.

The sintering step is preferably performed in the atmosphere

As a result, productivity of the iron oxide powder can be further improved and the saturation magnetization of the iron oxide powder can be more suitably controlled.

The heating temperature in the sintering step is not particularly limited, and is preferably 800° C. or higher and 1,300° C. or lower, more preferably 900° C. or higher and 1,200° C. or lower, and still more preferably 950° C. or higher and 1,150° C. or lower.

As a result, the saturation magnetization and shape (e.g., pore volume, peak pore diameter, BET specific surface area) of the iron oxide powder can be adjusted more suitably. Also, while making the braking property of the brake friction material more excellent, the occurrence of problems such as brake noise and damage to the disc with which the brake friction material comes into contact can be more effectively prevented.

In the sintering step, two or more stages of heat treatment (sintering treatment) under different conditions may be performed.

In addition, the iron oxide powder of the present invention can be manufactured by a method including: a pre-sintering step of pelletizing a composition containing $Fe_2O_3$ powder and pre-sintering the pellet to obtain a pre-sintered product: a granulating step of pulverizing the pre-sintered product, adding a binder and the like, and granulating by using a dry-mixing device; a binder removal step of performing a binder removal treatment on the obtained granules to obtain a defatted product; and a main sintering step of sintering (main sintering) the defatted product.

As a result, among iron oxide powder satisfying the conditions described above, those having a relatively large particle diameter (e.g., those having an average particle diameter of 100 μm or more) can be suitably manufactured. Furthermore, unlike the wet granulation method using an acid or alkali in the manufacturing process, the finally obtained iron oxide powder can be effectively prevented from containing remaining impurities or the like derived from the acid or alkali, and durability and reliability of the iron oxide powder and the brake friction material containing the iron oxide powder can be further improved. Furthermore, in the wet granulation method using an acid or alkali in the manufacturing process, it is difficult to make the saturation magnetization of the iron oxide powder sufficiently small. On the other hand, in the method described above, since the magnetization can be controlled in the sintering process by temperature or gas atmosphere, the iron oxide powder having a sufficiently small saturation magnetization can be easily obtained. In addition, in the case where the average particle diameter of the iron oxide powder is a value within the range described above, braking property of the brake friction material can be further improved. In addition, durability of the brake friction material containing the iron oxide powder can be further improved. Also, handleability of the iron oxide powder is further improved, and therefore, the safety of workers can be further enhanced during handling of the iron oxide powder (e.g., in manufacturing the brake friction material). In addition, fluidity of the iron oxide powder and mixing property with other components can be made excellent, and thus, for example, productivity of the brake friction material can be further improved.

Pellet production can be suitably performed by using a pressure molding machine.

The heating temperature in the pre-sintering step is not particularly limited, and is preferably 600° C. or higher and 1,200° C. or lower, more preferably 650° C. or higher and 1,000° C. or lower, and still more preferably 700° C. or higher and 900° C. or lower.

As a result, the saturation magnetization, shape (e.g., pore volume, peak pore diameter, BET specific surface area, etc.) and the like of the finally-obtained iron oxide powder can be adjusted more suitably. Also, while making the braking property of the brake friction material more excellent, the occurrence of problems such as brake noise and damage to the disc with which the brake friction material comes into contact can be more effectively prevented.

In the pre-sintering step, two or more stages of heat treatment (sintering treatment) may be performed.

As the binder to be added to the raw material or the pulverized material of the pre-sintered product, for example, polyvinyl alcohol (PVA), polyvinyl pyrrolidone (PVP), and the like can be used.

Examples of the dry-mixing device used at the granulation step include a Henschel mixer and the like.

The binder removal step can be suitably carried out by performing heating at a temperature lower than the treatment temperature in the main sintering step.

The heating temperature in the binder removal step is not particularly limited, and is preferably 400° C. or higher and 1,000° C. or lower, more preferably 450° C. or higher and 900° C. or lower, and still more preferably 500° C. or higher and 800° C. or lower.

As a result, the saturation magnetization and shape (e.g., pore volume, peak pore diameter, BET specific surface area) of the finally-obtained iron oxide powder can be adjusted more suitably. Also, while making the braking property of the brake friction material more excellent, the occurrence of problems such as brake noise and damage to the disc with which the brake friction material comes into contact can be more effectively prevented.

The main sintering step is preferably performed in the atmosphere

As a result, productivity of the iron oxide powder can be further improved and the saturation magnetization of the iron oxide powder can be more suitably controlled.

The heating temperature in the main sintering step is not particularly limited, and is preferably 800° C. or higher and 1,300° C. or lower, more preferably 900° C. or higher and 1,200° C. or lower, and still more preferably 950° C. or higher and 1,150° C. or lower.

As a result, the saturation magnetization and shape (e.g., pore volume, peak pore diameter, BET specific surface area) of the iron oxide powder can be adjusted more suitably. Also, while making the braking property of the brake friction material more excellent, the occurrence of problems such as brake noise and damage to the disc with which the brake friction material comes into contact can be more effectively prevented.

The heating time in the main sintering step is not particularly limited, and is preferably 1 hour or more and 24 hours or less.

As a result, the saturation magnetization, shape (e.g., pore volume, peak pore diameter, BET specific surface area, etc.) and the like of the iron oxide powder can be adjusted more suitably. Also, while making the braking property of the brake friction material more excellent, the occurrence of problems such as brake noise and damage to the disc with which the brake friction material comes into contact can be more effectively prevented.

(Brake Friction Material)

Next, the brake friction material containing the iron oxide powder according to the present invention will be described.

The brake friction material contains the iron oxide powder of the present invention described above.

As a result, it is possible to provide a brake friction material which is less likely to occur a problem of brake noise and has an excellent braking property.

The content of the iron oxide powder in the brake friction material is preferably 10 mass % or more and 90 mass % or less, and more preferably 20 mass % or more and 80 mass % or less.

The brake friction material may contain components other than the above-described iron oxide powder of the present invention.

Examples of such components include a binder (binding material), an organic filler, an inorganic filler, a fiber base material, and the like.

(Binding Material)

The binding material has a function of bonding and integrating the iron oxide powder and the like contained in the brake friction material to improve the strength as the brake friction material.

The binding material is not particularly limited and, for example, a thermosetting resin can be used.

Examples of the thermosetting resin include: epoxy resins; acrylic resins; silicone resins; thermosetting fluorine resins; phenolic resins; various elastomer-dispersed phenolic resins such as acrylic elastomer-dispersed phenolic resins and silicone elastomer-dispersed phenolic resins: various modified phenolic resins such as acrylic-modified phenolic resins, silicone-modified phenolic resins, cashew-modified phenolic resins, epoxy-modified phenolic resins, and alkylbenzene-modified phenolic resins; and the like. One kind or two or more kinds selected from the above can be used in combination.

In particular, it is preferable to use a phenolic resin, an acrylic-modified phenolic resin, a silicone-modified phenolic resin, or an alkylbenzene-modified phenolic resin in order to give favorable heat resistance, moldability and a friction coefficient.

The content of the binding material in the brake friction material is preferably 4 mass % or more and 20 mass % or less, and more preferably 5 mass % or more and 10 mass % or less.

As a result, while making the strength of the brake friction material excellent, porosity and elastic modulus of the brake friction material can be made more appropriate. As a result, it is possible to more effectively prevent and suppress the deterioration in the sound-vibration performance such as the brake noise.

(Organic Filler)

The organic filler has, for example, a function as a friction modifier for improving the sound-vibration performance, wear resistance and the like of the brake friction material.

The organic filler is not particularly limited, and for example, cashew dust, a rubber component and the like can be used.

The cashew dust is obtained by pulverizing hardened cashew nut shell oil.

Examples of the rubber component described above include tire rubber, acrylic rubber, isoprene rubber, NBR (nitrile butadiene rubber), SBR (styrene butadiene rubber), chlorinated butyl rubber, butyl rubber, silicone rubber, and the like. One kind or two or more kinds selected from the above can be used in combination.

The content of the organic filler in the brake friction material is preferably 0.5 mass % or more and 20 mass % or less, more preferably 1 mass % or more and 10 mass % or less, and still more preferably 3 mass % or more and 8 mass % or less.

As a result, it is possible to more effectively prevent and suppress an increase in the elastic modulus of the brake friction material and a deterioration in the sound-vibration performance such as brake noise. Also, it is possible to more effectively prevent and suppress a deterioration in the heat resistance and a decrease in the strength due to thermal history.

(Inorganic Filler)

The inorganic filler is added for the purpose of, for example, avoiding deterioration in heat resistance of the brake friction material, improving wear resistance, improving friction coefficient, improving lubricity, adjusting pH, and the like.

Examples of the above-described inorganic filler include tin sulfide, molybdenum disulfide, iron sulfide, antimony trisulfide, bismuth sulfide, zinc sulfide, calcium hydroxide, calcium oxide, sodium carbonate, barium sulfate, coke, graphite, mica, vermiculite, calcium sulfate, talc, clay, zeolite, mullite, chromite, wollastonite, sepiolite, titanium oxide, magnesium oxide, silica, dolomite, calcium carbonate, magnesium carbonate, calcium silicate, zirconium silicate, γ-alumina, manganese dioxide, zinc oxide, cerium oxide, zirconia, titanates such as potassium titanate, potassium hexatitanate, potassium octatitanate, lithium potassium titanate, magnesium potassium titanate, and sodium titanate, and the like. One kind or two or more kinds selected from the above can be used in combination.

The content of the inorganic filler in the brake friction material is preferably 20 mass % or more and 80 mass % or less, more preferably 25 mass % or more and 70 mass % or less, and still further preferably 30 mass % or more and 60 mass % or less.

As a result, heat resistance of the brake friction material can be further improved and it is also preferable in terms of the content balance of the other components of the brake friction material (components other than iron oxide powder, such as binding materials, organic fillers, inorganic fillers, fiber base materials, etc.).

(Fiber Base Material)

The fiber base material exhibits a reinforcing action in the brake friction material.

Examples of the fiber base material to be used include inorganic fibers composed of metal materials or other inorganic materials, organic fibers composed of organic materials, fibers composed of composite materials thereof, and the like. One kind or two or more kinds selected from those can be used in combination.

Examples of the inorganic fibers (metal fibers) to be used, composed of metal materials include for example, a fiber containing, as a main component, a metal such as Al, Fe, Zn, Sn, Ti, Ni, Mg, Si, and Cu or an alloy containing at least one of the above. In addition to the fiber form, such metals and alloys may be contained in the form of powder.

Examples of the inorganic fibers composed of inorganic materials other than metal materials include ceramic fiber, mineral fiber, glass fiber, silicate fiber, basalt fiber, and the like. One kind or two or more kinds selected from the above can be used in combination. Among the inorganic fibers, biodegradable mineral fibers containing $SiO_2$, $Al_2O_3$, $CaO$, $MgO$, $FeO$, $Na_2O$, or the like in any combination are preferable, and examples of a commercial item thereof include Roxul series manufactured by LAPINUS FIBERS B.V and the like.

Examples of the organic fibers composed of the organic materials include carbon fibers, aramid fibers, cellulose fibers, acrylic fibers, phenolic resin fibers, poly (para-phenylene benzobisoxazole) fibers, biodegradable ceramic fibers, and the like. One kind or two or more kinds selected from the above can be used in combination.

Examples of the carbon fibers include flame-resistant fibers, pitch carbon fibers, PAN carbon fibers, activated carbon fibers, and the like. One kind or two or more kinds selected from the above can be used in combination.

The content of the fiber base material in the brake friction material is preferably 2 mass % or more and 40 mass % or less, more preferably 2 mass % or more and 20 mass % or less, and still more preferably 2 mass % or more and 15 mass % or less.

As a result, while making the strength of the brake friction material excellent, porosity of the brake friction material can be made more appropriate. As a result, it is possible to more effectively prevent and suppress the deterioration in sound-vibration performance such as brake noise. In addition, wear resistance of the brake friction material can be further improved. Furthermore, when the brake friction material is manufactured, more excellent formability can be obtained.

Hereinbefore, the preferred embodiments of the present invention are described. However, the present invention is not limited thereto.

For example, in the method for manufacturing the iron oxide powder of the present invention, if necessary, other steps (pre-treatment steps, intermediate steps, post-treatment steps) may be included in addition to the steps described above. More specifically, for example, a classification step of performing classification treatment may be included. As the classification method, for example, air classification, mesh filtration, sedimentation, classification using various sieves, and the like can be exemplified.

In addition, the iron oxide powder of the present invention is not limited to one manufactured by the method described above and may be manufactured by any method.

EXAMPLES

Hereinafter, the present invention will be described in detail based on Examples and Comparative Examples. However, the present invention is not limited thereto.
(1) Manufacture of Iron Oxide Powder:

The iron oxide powder of each of Examples and Comparative Examples was manufactured as follows.

Example 1

First, to $Fe_2O_3$ as a raw material were added carbon black, water, PVA as a binder component, and a polycarboxylic-acid dispersant so as to have a solid content of 55 mass %, followed by mixing by a bead mill, and the slurry obtained by mixing was granulated by spraying and drying with a spray dryer.

Next, the resultant was heated at 1,000° C. in the atmosphere by using an electric furnace, to thereby perform a sintering (main sintering).

Then, disaggregation and classification were performed to obtain iron oxide powder having an average particle diameter of 60 μm.

The average particle diameter (volume average particle diameter) of the iron oxide powder was obtained by the following measurement. That is, first, in a 100 ml-beaker were placed 10 g of the iron oxide powder as a sample and 80 ml of water and two drops of dispersant (sodium hexametaphosphate) were added thereto. Next, the dispersion was performed by using an ultrasonic homogenizer (UH-150, manufactured by SMT. Co. LTD.). At this time, the output level of the ultrasonic homogenizer was set to 4 and dispersion was performed for 20 seconds. Then, bubbles formed on the surface of the beaker were removed, the sample was introduced into a microtrack particle size analyzer (Model 9320-X100, manufactured by Nikkiso Co., Ltd.), and the measurement was performed. Also, the measurement was performed on each of Examples and on each of Comparative Examples described below with the same procedures. However, for particles with an average particle diameter of 100 μm or more, 30 particles of the SEM image at 50 times magnification were captured and the average value of the Feret diameters in the horizontal direction was adopted as the value of the average particle diameter.

Furthermore, when a magnetization measurement was performed on the obtained iron oxide powder by using a vibrating sample magnetometer, the saturation magnetization was 0.2349 emu/g.

The magnetic properties described above were obtained as follows. That is, first, the iron oxide powder was packed in a cell having an inner diameter of 5 mm and a height of 2 mm and set in the vibrating sample magnetometer (VSM-C7-10A manufactured by Toei Industry Co., Ltd.). Next, a magnetic field was applied and swept to 5 K*1000/4π·A/m, and then the applied magnetic field was decreased to create a hysteresis curve. Then, the magnetization was determined from the data of the curve. Also, the measurement was performed on each of Examples and on each of Comparative Examples described below with the same procedures.

Furthermore, the obtained iron oxide powder had a pore volume of 81 mm$^3$/g, a peak pore diameter of 0.51 μm, a BET specific surface area of 0.61 m$^2$/g, a blackness (L*value) of 29.088, an a* value of 3.73, a b* value of −1.04, a chlorine content of below the detection lower limit (<2 ppm), and a sulfur content of 13 ppm. The particles constituting the iron oxide powder had an average shape factor SF-1 of 124, an average shape factor SF-2 of 114, pH of 8.62, and an apparent density of 1.78 g/cm$^3$.

The pore volume and peak pore diameter of the iron oxide powder were obtained by using mercury porosimeters Pascal 140 and Pascal 240 (manufactured by Thermo Fisher Scientific Ltd.). More specifically, CD3P (for powder) was used as a dilatometer and the sample was placed in a multi-perforated commercial gelatin-made capsule and placed in the dilatometer. After degassing in Pascal 140, mercury was filled and measurement in a low-pressure region (0 to 400 Kpa) was performed, which was taken as 1st Run. Next, degassing and measurement in the low-pressure region (0 to 400 Kpa) were performed again, which was taken as 2nd Run. After 2nd Run, the combined weight of the dilatometer, mercury, the capsule, and the sample was measured. Next, measurement in a high-pressure region (0.1 Mpa to 200 Mpa) was performed with Pascal 240. The pore volume, pore diameter distribution, and peak pore diameter of the iron oxide powder were obtained from the mercury injection amount obtained by the measurement of the high-pressure portion. In addition, when the pore diameter was obtained, the calculation was performed with setting the surface tension of mercury to 480 dyn/cm (1 dyn/cm=1×10$^{-3}$ N/m) and setting the contact angle to 141.3°.

Furthermore, the BET specific surface area was obtained by a measurement using a specific surface area-measuring device (model: Macsorb HM model-1208 (manufactured by Mountech Co., Ltd.)). More specifically, about 5 g of a measuring sample was placed in a standard sample cell dedicated for the specific surface area-measuring device and was accurately weighed with a precision balance, and then the sample (iron oxide powder) was set in a measurement port and the measurement was started. The measurement was performed by a one-point method, and when the weight of the sample was input at the end of the measurement, the BET specific surface area was automatically calculated. Furthermore, as a pre-treatment before the measurement, about 20 g of the measuring sample was placed into a weighing paper and then, degassing was performed until −0.1 MPa with a vacuum dryer and it was confirmed that the degree of vacuum reached −0.1 MPa or less and thereafter, it was heated at 200° C. for two hours. The measurement environment was set in the condition of temperature of 10 to 30° C. and humidity of 20 to 80% in relative humidity, without condensation.

Regarding the degree of blackness (L* value), a* value and b* value, the sample (iron oxide powder) was filled in a plastic container with a diameter of 37 mm, the heaped portion was leveled off to be almost flat, the container was sealed with polyethylene wrap on the surface thereof, and the measurement was performed thereon by using a color-difference meter (X-Rite 938, manufactured by X-Rite Co., Ltd.).

The measurement of the chlorine content and sulfur content was performed by quantitative analysis of the anion components contained in the iron oxide powder with a combustion ion chromatography under the following conditions.

Combustion device: AQF-2100H, manufactured by Mitsubishi Chemical Analytech Co., Ltd.
Sample amount: 50 mg
Combustion temperature: 1,100° C.
Combustion time: 10 minutes
Ar flow rate: 400 ml/min
$O_2$ flow rate: 200 ml/min
Humidification air flow rate: 100 ml/min
Absorbent solution: solution in which 1 wt % of hydrogen peroxide was dissolved in the following eluent
Analyzer: IC-2010, manufactured by Tosoh Corporation
Column: TSKgel SuperIC-Anion HS (4.6 mm I.D.×1 cm+4.6 mm I.D.×10 cm)
Eluent: solution in which 3.8 mmol of $NaHCO_3$ and 3.0 mmol of $Na_2CO_3$ were dissolved in 1 L of water
Flow rate: 1.5 mL/min
Column temperature: 40° C.
Injection volume: 30 μL
Measurement mode: Suppressor method
Detector: CM detector
Standard sample: anion-mixed standard solution, manufactured by Kanto Chemical Co., INC.

Also, the measurement of the chlorine content and sulfur content was performed for each of Examples and each of Comparative Examples described below in the same manner as described above.

The shape factor SF-1 and the shape factor SF-2 were obtained as follows.

That is, for example, 100 particles constituting the iron oxide powder were observed by using FE-SEM (SU-8020), manufactured by Hitachi High-Technologies Corporation, and the Feret diameter (maximum), S (projection area), and L (projection perimeter) were obtained by using an image analysis software, Image-Pro Plus, and then the values of the shape factor SF-1' and the shape factor SF-2' were calculated from the equations (1) and (2) described above. From those results, the average value of the shape factors SF-1' and the average value of the shape factors SF-2' for respective particles were obtained and used as the shape factor SF-1 and the shape factor SF-2 of the particles constituting the iron oxide powder.

Also, the shape factors were obtained for each of Examples and each of Comparative Examples described below in the same manner.

The measurement of pH was performed by a glass electrode method using HM-20J (manufactured by DKK-TOA Corporation). In a beaker was weighed 5 g of the iron oxide particles and 100 mL of ultrapure water was added thereto and then, after stirring for 30 seconds, pH electrode was immediately inserted and the pH value was read.

Also, the pH values were obtained for each of Examples and each of Comparative Examples described below in the same manner as described above.

The apparent density was measured in accordance with JIS Z 2504. The details are as follows.

1. Device

A powder apparent density meter including a funnel, a cup, a funnel support, a support bar, and a support base is used. A balance having a weighing capacity of 200 g and a sensitivity of 50 mg is used.

2. Measuring Method (1) The amount of the sample is set to at least 150 g or more.

(2) The sample is poured into the funnel having an orifice with a hole diameter of $2.5^{+0.2/-0}$ mm until the poured sample fills the cup and overflows.

(3) As soon as the sample starts to overflow, the pouring of the sample is stopped and the sample heaped on the cup is removed with a spatula to be flat along the top end of the cup without giving vibration.

(4) The side of the cup is gently tapped to sink the sample and remove the sample adhering to the outside of the cup, and the weight of the sample in the cup is weighed with an accuracy of 0.05 g.

3. Calculation

The numerical value obtained by multiplying the measured value obtained in the preceding paragraph 2-(4) by 0.04 is rounded to the second decimal place in accordance with JIS-Z8401 (numerical rounding method) to obtain the apparent density with a unit of "$g/cm^3$".

The magnetic properties were measured by using a vibrating sample magnetometer (type: VSM-C7-10A (manufactured by Toei Industry Co., Ltd.)). The measuring sample (ferrite particles) was packed in a cell with an inner diameter of 5 mm and a height of 2 mm and set in the above device. The measurement was performed by applying a magnetic field and sweeping until 5 K·1000/4·A/m. Then, the applied magnetic field was reduced to create a hysteresis curve on a recording paper. From the data of the curve, the magnetization was read at the applied magnetic field of 5 K·1000/4·A/m. Also, residual magnetization and coercivity were calculated in the same manner.

Examples 2 to 8

The iron oxide powder was manufactured in the same manner as in Example 1 except that the conditions of the iron oxide powder were set as shown in Table 2 by adjusting the granulation conditions in the spray dryer and the sintering treatment conditions.

Example 9

First, to $Fe_2O_3$ as a raw material was added polyvinyl alcohol (10 mass % aqueous solution) as a binder component so as to have a solid content of 55 mass %, followed by mixing for 15 minutes using a Henschel mixer and granulation was performed.

Then, the obtained granulates were subjected to a binder removal treatment at 800° C. to remove the organic matters, and then the resultant was held in the atmosphere at 1,000° C. for 4 hours in an electric furnace to carry out a main sintering.

Thereafter, disaggregation and classification were performed to obtain the iron oxide powder having the average particle diameter of 150 μm.

Moreover, when the measurement was performed on the obtained iron oxide powder by using the vibrating sample magnetometer, the saturation magnetization thereof was 0.1678 emu/g.

Furthermore, the obtained iron oxide powder had the pore volume of 88 mm$^3$/g, the peak pore diameter of 0.42 μm, the BET specific surface area of 0.38 m$^2$/g, the blackness (L* value) of 25.84, the a* value of 5.31, the b* value of 0.87, the chlorine content of 35 ppm, and the sulfur content of 38 ppm. The particles constituting the iron oxide powder had the average shape factor SF-1 of 140, the average shape factor SF-2 of 126, the pH of 8.63, and the apparent density of 1.61 g/cm$^3$.

Examples 10 and 11

The iron oxide powder was manufactured in the same manner as in Example 9 except that the conditions of the iron oxide powder were set as shown in Table 2 by adjusting the granulation conditions in the Henschel mixer and the main sintering treatment conditions.

Comparative Example 1

The iron oxide powder was manufactured in the same manner as in Example 1 except that the spraying and drying conditions in the spray dryer were changed.

Comparative Example 2

The iron oxide powder was manufactured in the same manner as in Example 1 except that the granules were sintered in a non-oxidative atmosphere (in a nitrogen atmosphere) by using a rotary kiln under the condition of a heating temperature of 900° C.

Comparative Example 3

To a reactor were added 10 L of an aqueous ferrous sulfate solution containing Fe$^{2+}$ at a concentration of 1.9 mol/L and 4 L of a 12 N aqueous sodium hydroxide solution, and the reaction was carried out at 95° C. with a stirrer rotation speed of 5 rpm and aeration of oxygen of 1.5 L per minute. In this case, the reaction iron concentration was 1.36 mol/L.

After the reaction was finished, filtration, washing with water, dring, and pulverization were performed to obtain iron oxide powder.

The obtained iron oxide powder had the average particle diameter of 0.6 μm.

Moreover, when the measurement was performed on the obtained iron oxide powder by using the vibrating sample magnetometer, the saturation magnetization was 83.10 emu/g.

Furthermore, the obtained iron oxide powder had the pore volume of 157 mm$^3$/g, the peak pore diameter of 0.13 μm, the BET specific surface area of 3.90 m$^2$/g, the blackness (L* value) of 15.31, the chlorine content of below the detection lower limit (<2 ppm), and the sulfur content of 750 ppm. The particles constituting the iron oxide powder had the average shape factor SF-1 of 155, the average shape factor SF-2 of 109, the pH of 8.44, and the apparent density of 0.98 g/cm$^3$.

The manufacturing conditions of the iron oxide powder of the respective Examples and the respective Comparative Examples described above are collectively shown in Table 1, and the characteristics and the like of the iron oxide powder of the respective Examples and the respective Comparative Examples described above are summarized in Table 2. The iron oxide powders of all Examples had a proportion of particles of 0.8 μm or less being 5 mass % or less among particles constituting the iron oxide powder. Also, the iron oxide powders of all Examples had a content of α-Fe$_2$O$_3$ being 99 mass % or more in the iron oxide powder.

The particle diameter (average particle diameter) of the granules are measured by the same method as the measurement of the average particle diameter of the iron oxide powder.

TABLE 1

| | Granule condition | Sintering condition | | |
|---|---|---|---|---|
| | Particle diameter of granule [μm] | Sintering method | Sintering temperature [° C.] | Sintering atmosphere |
| Ex. 1 | 65 | Electric furnace | 1,000 | Atmosphere |
| Ex. 2 | 65 | Electric furnace | 1,150 | Atmosphere |
| Ex. 3 | 45 | Electric furnace | 1,000 | Atmosphere |
| Ex. 4 | 110 | Electric furnace | 1,000 | Atmosphere |
| Ex. 5 | 65 | Electric furnace | 950 | Atmosphere |
| Ex. 6 | 65 | Rotary kiln | 900 | Atmosphere |
| Ex. 7 | 33 | Electric furnace | 1,000 | Atmosphere |
| Ex. 8 | 39 | Electric furnace | 1,000 | Atmosphere |
| Ex. 9 | 180 | Electric furnace | 1,000 | Atmosphere |
| Ex. 10 | 300 | Electric furnace | 1,000 | Atmosphere |
| Ex. 11 | 420 | Electric furnace | 1,000 | Atmosphere |
| Comp. Ex. 1 | 28 | Electric furnace | 1,000 | Atmosphere |
| Comp. Ex. 2 | 65 | Rotary kiln | 900 | Nitrogen |
| Comp. Ex. 3 | Fe$_3$O$_4$ by wet synthesis | | | |

TABLE 2

| | Average particle diameter [μm] | Saturation magnetization [emu/g] | Residual magnetization [emu/g] | Coercive force [Oe] | Average shape factor SF-1 | Average shape factor SF-2 | Pore volume [mm$^3$/g] | Peak pore diameter [μm] | BET specific surface area [m$^2$/g] |
|---|---|---|---|---|---|---|---|---|---|
| Ex. 1 | 60 | 0.2349 | 0.0809 | 1140 | 124 | 114 | 81 | 0.51 | 0.61 |
| Ex. 2 | 60 | 0.2876 | 0.1802 | 1664 | 126 | 112 | 11 | 1.20 | 0.08 |
| Ex. 3 | 40 | 0.1823 | 0.0668 | 1917 | 113 | 106 | 55 | 0.78 | 0.85 |
| Ex. 4 | 100 | 0.1794 | 0.0604 | 1819 | 133 | 118 | 76 | 0.63 | 0.11 |
| Ex. 5 | 60 | 0.2567 | 0.0897 | 1098 | 119 | 115 | 101 | 0.38 | 0.91 |
| Ex. 6 | 60 | 18.6500 | 14.0500 | 82 | 122 | 116 | 87 | 0.49 | 0.18 |

TABLE 2-continued

| | | | | | | | | | |
|---|---|---|---|---|---|---|---|---|---|
| Ex. 7 | 30 | 0.1342 | 0.0432 | 1864 | 105 | 105 | 152 | 0.82 | 1.02 |
| Ex. 8 | 35 | 0.1598 | 0.0678 | 1345 | 108 | 106 | 134 | 0.84 | 0.90 |
| Ex. 9 | 150 | 0.1678 | 0.0504 | 1679 | 140 | 126 | 88 | 0.42 | 0.38 |
| Ex. 10 | 250 | 0.1586 | 0.0444 | 1522 | 142 | 131 | 81 | 0.39 | 0.32 |
| Ex. 11 | 350 | 0.1389 | 0.0389 | 1433 | 142 | 143 | 73 | 0.92 | 0.26 |
| Comp. Ex. 1 | 25 | 0.1276 | 0.0534 | 2304 | 106 | 107 | 79 | 0.63 | 1.21 |
| Comp. Ex. 2 | 60 | 84.49 | 4.9570 | 56 | 125 | 115 | 56 | 0.21 | 0.36 |
| Comp. Ex. 3 | 0.6 | 83.10 | 23.5600 | 65 | 155 | 109 | 157 | 0.13 | 3.90 |

| | Apparent density [g/cm$^3$] | True specific gravity [g/cm$^3$] | Powder pH | Chlorine content [ppm] | Sulfur content [ppm] | Fe [wt %] | L* Value | a* Value | b* Value |
|---|---|---|---|---|---|---|---|---|---|
| Ex. 1 | 1.78 | 5.27 | 8.62 | <2 | 13 | 68.18 | 29.09 | 3.73 | −1.04 |
| Ex. 2 | 2.25 | 5.27 | 8.65 | <2 | 15 | 68.80 | 32.35 | 0.47 | −2.33 |
| Ex. 3 | 1.22 | 5.27 | 7.32 | <2 | 10 | 68.30 | 29.18 | 5.89 | −0.13 |
| Ex. 4 | 2.13 | 5.27 | 8.55 | <2 | 16 | 68.34 | 30.98 | 0.20 | 0.55 |
| Ex. 5 | 1.43 | 5.27 | 6.32 | 7 | 22 | 68.38 | 27.21 | 4.56 | 0.13 |
| Ex. 6 | 1.51 | 5.10 | 6.76 | 125 | 52 | 68.46 | 26.21 | 2.23 | 0.76 |
| Ex. 7 | 1.10 | 5.27 | 6.23 | 70 | 30 | 68.23 | 26.86 | 6.10 | 0.64 |
| Ex. 8 | 1.19 | 5.27 | 6.90 | 27 | 34 | 68.90 | 27.87 | 5.98 | 0.02 |
| Ex. 9 | 1.61 | 5.27 | 8.63 | 35 | 38 | 68.33 | 25.84 | 5.31 | 0.87 |
| Ex. 10 | 1.72 | 5.27 | 8.56 | <2 | 11 | 68.45 | 28.21 | −0.02 | 0.23 |
| Ex. 11 | 1.97 | 5.27 | 8.53 | <2 | 14 | 68.45 | 30.88 | 5.24 | −0.36 |
| Comp. Ex. 1 | 1.08 | 5.27 | 5.93 | 187 | 80 | 68.44 | 24.87 | 6.22 | 1.30 |
| Comp. Ex. 2 | 1.92 | 5.27 | 8.21 | 156 | 68 | 70.02 | 22.46 | 0.67 | −1.60 |
| Comp. Ex. 3 | 0.98 | 5.05 | 8.44 | <2 | 750 | 70.43 | 15.31 | −0.21 | 0.20 |

(2) Evaluation of Oxidation Degree of Iron Particles by Iron Oxide Particles:

In each of Examples and each of Comparative Examples, 50 g of iron particles (Micropowder IRON S-1640, manufactured by Ashland) having an average particle diameter of 5 μm and 12.5 g of the respectively obtained iron oxide powder were mixed by using a ball mill, and then the amount of Fe (II) is calculated based on JIS M8212. Furthermore, after the mixture was exposed to a high temperature and high humidity environment (temperature of 45° C., relative humidity of 80%) for 5 days, the amount of Fe (II) was calculated in the same manner.

The degree of oxidation of the iron particles by the iron oxide particles was calculated from the following equation using Fe (II) before and after exposure to the high temperature and high humidity environment.

Degree of Oxidation (%)=100−{(Amount of Fe(II) after exposure)/(Amount of Fe(II)before exposure)×100}

(3) Manufacture of Molded Article Using Iron Oxide Particles and FE-SEM Evaluation:

In each of Examples and each of Comparative Examples, 4.5 g of the respectively obtained iron oxide powder and 0.5 g of a fluorine resin powder were mixed by using a ball mill, and then 1 g of the mixture was placed in a mold having a cross-sectional area of 1.13 cm$^2$ and pressurized at 50 kN to produce a molded article of the mixture. The side perpendicular to the pressing direction of the obtained molded article was processed by an ion-milling and the cross section was observed with FE-SEM.

Processing was performed under the following condition by using IM-4000, manufactured by Hitachi High-Technologies Corporation as an ion-milling device.

DISCHARGE VOLTAGE (discharge voltage): 1.5 kV
ACCELERATION VOLTAGE (acceleration voltage): 6 kV
STAGE CONTROL (processing mode): C3
DISCHARGE CURRENT (discharge current inside ion gun): 380 to 450 μA
ION BEAM CURRENT (ion beam current): 110 to 140 μA
GAS FLOW (argon gas flow rate): 0.07 to 0.10 cm$^3$/min
Processing time: 60 minutes SU-8020, manufactured by Hitachi High-Technologies Corporation, was used as FE-SEM and images were taken at an acceleration voltage of 1 kV, an LA mode, and 450 times magnification, and then, evaluation was carried out according to the following criteria.

A: Although particles are deformed, a portion in which iron oxide particles are present can be distinguished from a portion of resin only.

B: Many iron oxide parts are included in a field of view.

C*1: Particles are deformed, and resin and iron oxide are spread uniformly in the molded article.

C*2: A portion in which particles are broken and a portion in which the shape of the particle is maintained (the particles are not deformed) are mixed.

C*3: Resin and iron oxide are spread uniformly in the molded article.

Those results are summarized in Table 3 together with the magnetic properties after a stress test using a sample mill for the iron oxide powder of the respective Examples and respective Comparative Examples.

As the stress test using a sample mill, 100 g of the sample was put into a sample mill SAM (manufactured by Nara Machinery Co., Ltd.) and pulverizing treatment was performed for ten seconds under a setting of 16,000 rpm by using a standard rotor.

TABLE 3

| | Evaluation of oxidation degree Oxidation degree [%] | Evaluation of molded article FE-SEM | Magnetic properties (after stress test with sample mill) | | | | | |
|---|---|---|---|---|---|---|---|---|
| | | | Saturation magnetization [emu/g] | Residual magnetization [emu/g] | Coercive force [Oe] | ΔMs [emu/g] | ΔMr [emu/g] | ΔHc [Oe] |
| Ex. 1 | 1 | A | 0.1579 | 0.0458 | 1135 | −0.0770 | −0.0351 | −5 |
| Ex. 2 | 0 | A | 0.2762 | 0.1608 | 1621 | −0.0114 | −0.0194 | −43 |
| Ex. 3 | 0 | A | 0.1854 | 0.0616 | 1232 | 0.0031 | −0.0051 | −685 |
| Ex. 4 | 2 | A | 0.1896 | 0.0523 | 1690 | 0.0102 | −0.0081 | −129 |
| Ex. 5 | 1 | A | 0.2452 | 0.0890 | 1076 | −0.0115 | −0.0007 | −21 |
| Ex. 6 | 4 | A | 16.92 | 15.40 | 95 | −1.7300 | 1.3500 | 12 |
| Ex. 7 | 3 | A | 0.1308 | 0.0402 | 1390 | −0.0034 | −0.0030 | −474 |
| Ex. 8 | 2 | A | 0.1516 | 0.0634 | 1102 | −0.0082 | −0.0044 | −243 |
| Ex. 9 | 1 | A | 0.1589 | 0.0524 | 1423 | −0.0089 | 0.0020 | −256 |
| Ex. 10 | 1 | A | 0.1564 | 0.0448 | 1208 | −0.0022 | 0.0003 | −314 |
| Ex. 11 | 0 | A | 0.1378 | 0.0384 | 1083 | −0.0011 | −0.0005 | −349 |
| Comp. Ex. 1 | 12 | C*1 | 0.1253 | 0.0497 | 1545 | −0.0023 | −0.0037 | −759 |
| Comp. Ex. 2 | 9 | A | 83.65 | 8.133 | 92 | −0.8400 | 3.1760 | 36 |
| Comp. Ex. 3 | 2 | C*3 | 82.10 | 26.21 | 90 | −1.000 | 2.6500 | 25 |

In each of Examples described above, undesirable dropping-off of the iron oxide particles and the like were not observed and excellent results were obtained.

On the other hand, Comparative Examples 1 and 2 in which the sulfur content and the chlorine content were extremely large, showed the results of high degrees of oxidation of the iron particles, which brings a concern that oxidation, corrosion and the like of a disc with which the brake friction material comes into contact may easily occur.

In addition, Comparative Examples 2 and 3 in which the saturation magnetization of the iron oxide powder was extremely large, showed the results which brings a concern that the saturation magnetization is large and thus brake noise may occur in the case of being added and used in the brake friction material.

Also, Comparative Example 3 in which the average particle diameter of the iron oxide powder was extremely small, showed the result indicating a high possibility that the effect cannot be obtained since portions of resin only and portions of the iron oxide particles are uniformly mixed and thus, the iron oxide particles are not localized and the wear amount becomes similar as that of conventional iron oxide particles in the case of being used as a brake material.

The figures showing the cross-sectional SEM photographs of the molded articles manufactured by using the iron oxide powder for a brake friction material of Example 1 and Comparative Example 1 are respectively shown in FIG. 1 and FIG. 2.

INDUSTRIAL APPLICABILITY

The iron oxide powder for a brake friction material of the present invention has an average particle diameter of 1.0 μm or more, a chlorine content in a combustion ion chromatography of 150 ppm or less and a saturation magnetization of 20 emu/g or less. Therefore, it is possible to provide iron oxide powder suitably usable as a brake friction material which is less likely to occur a problem of brake noise and has an excellent braking property. Therefore, the iron oxide powder for a brake friction material of the present invention possesses an industrial applicability.

The present invention is described in detail and with reference to specific embodiments, but it will be apparent to those skilled in the art that various changes and modifications can be made without departing from the spirit and scope of the present invention.

This application is based on Japanese patent application (No. 2016-240077) filed on Dec. 12, 2016, Japanese patent application (No. 2017-061855) filed on Mar. 27, 2017, and Japanese patent application (No. 2017-150981) filed on Aug. 3, 2017, the contents of which are incorporated herein by reference.

The invention claimed is:

1. An iron oxide powder for a brake friction material, having: an average particle diameter of 30 μm or more, a chlorine content of 150 ppm or less in a combustion ion chromatography, a saturation magnetization of 20 emu/g or less, and a blackness (L* value) of 23 or more and 33 or less.

2. The iron oxide powder for a brake friction material according to claim 1, having:
a shape factor SF-1 of 100 or more and 150 or less.

3. The iron oxide powder for a brake friction material according to claim 1, having:
a pore volume of 10 mm³/g or more and 180 mm³/g or less.

4. The iron oxide powder for a brake friction material according to claim 1, having:
a BET specific surface area of 0.05 m²/g or more and 1.20 m²/g or less.

5. The iron oxide powder for a brake friction material according to claim 1, having:
a peak pore diameter of 0.2 μm or more and 1.2 μm or less.

* * * * *